United States Patent
Wu et al.

(10) Patent No.: US 7,601,764 B2
(45) Date of Patent: Oct. 13, 2009

(54) PHOTOSENSITIVE RESIN COMPOSITION

(75) Inventors: Tu-Yi Wu, Hukou Township, Hsinchu County (TW); Guan-An Chen, Hukou Township, Hsinchu County (TW)

(73) Assignee: Axin Materials Corporation, Taiwan (CN)

( * ) Notice: Subject to any disclaimer, the term of this patent is extended or adjusted under 35 U.S.C. 154(b) by 279 days.

(21) Appl. No.: 11/891,188

(22) Filed: Aug. 9, 2007

(65) Prior Publication Data

US 2008/0039544 A1 Feb. 14, 2008

(30) Foreign Application Priority Data

Aug. 11, 2006 (TW) ............................... 95129730 A

(51) Int. Cl.
 *G03F 7/00* (2006.01)
 *C08L 33/00* (2006.01)
(52) U.S. Cl. ............................ 522/37; 522/39; 522/40; 522/41; 522/42; 522/43; 522/44; 522/46; 522/53; 522/79; 522/80; 522/121; 430/281.1
(58) Field of Classification Search ................ 522/121, 522/79, 80, 37, 39, 40, 41, 42, 43, 44, 46, 522/53; 430/281.1; 526/328, 328.5
See application file for complete search history.

(56) References Cited

U.S. PATENT DOCUMENTS 7,446,159 B1 * 11/2008 Samukawa et al. .......... 526/284
7,553,883 B2 * 6/2009 Yatake ....................... 523/160
2005/0148676 A1 * 7/2005 Doi et al. ....................... 520/1
2006/0261318 A1 * 11/2006 Morimoto et al. ........... 252/582
2007/0043143 A1 * 2/2007 Sanai ........................... 523/160
2008/0227885 A1 * 9/2008 Sanai ........................... 522/180
2009/0175585 A1 * 7/2009 Makino et al. ............... 385/129

* cited by examiner

*Primary Examiner*—Susan W Berman
(74) *Attorney, Agent, or Firm*—Ladas and Parry LLP

(57) ABSTRACT

The invention pertains to a photosensitive resin composition, comprising:
 (A) an alkaline soluble resin;
 (B) a multi-functional monomer;
 (C) a photoinitiator;
 (D) a colorant; and
 (E) a solvent,
wherein said alkaline soluble resin comprises a copolymer obtained from the copolymerization of 5-95 wt % of the monomer of formula (1):

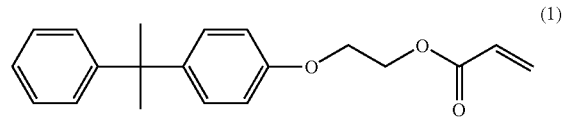

(1)

and 5-95 wt % of an ethylenically unsaturated monomer containing at least one carboxy group.

The inventive photosensitive resin composition possesses good heat resistance, development properties, and adhesion properties and can be used in liquid crystal displays as a photosensitive material for the manufacture of color filters.

6 Claims, No Drawings

PHOTOSENSITIVE RESIN COMPOSITION

BACKGROUND OF THE INVENTION

1. Field of the Invention

The present invention relates to a photosensitive resin composition that can be polymerized upon being irradiated with light and then developed with an alkaline solution.

2. Description of the Prior Art

With an increasing market demand for color liquid crystal displays, various methods for the manufacture of color filters have been developed, such as coloring methods, printing methods, electroplating methods, and dispersion methods, among which coloring methods are the mainstream ones.

Coloring methods comprise patterning a photosensitive water-soluble photoresist and conducting coloring, fixing, and anti-fouling treatments to obtain red, blue, and green pixels. Although coloring methods are advantageous in respect of the fineness and dispersion properties, they normally encounter the problems of poor heat resistance. Therefore, dispersion methods were adopted instead to avoid the shortcomings associated with heat resistance. Dispersion methods comprise dispersing black and red, blue, and green pigments in an alkaline soluble resin material to form a photosensitive resin composition, and coating the resultant composition onto a glass substrate, and then subjecting the coated substrate to pre-baking, exposure, development, and post-baking treatments, so as to obtain the red, blue, and green pixels. Nevertheless, a process for manufacturing color filters requires many times of heat treatment, which is normally conducted at a high temperature of more than 200° C. However, for conventional photosensitive resins, if they are heated at 180° C. for about 1 hour, pigment aggregates normally occur.

Given the above, the inventor, upon extensive studies, has developed a photosensitive resin composition for color filters. Particularly, the inventive photosensitive resin composition, upon being coated, pre-baked, exposed, developed, and post-baked, provides a pixel-containing coloring layer that has good heat resistance and chemistry resistance without pigment aggregates and is useful for a color filter.

SUMMARY OF THE INVENTION

The object of the invention is to provide a photosensitive resin composition comprising:

(A) an alkaline soluble resin;
(B) a multi-functional monomer;
(C) a photoinitiator,
(D) a pigment; and
(E) a solvent.

DETAILED DESCRIPTION OF THE INVENTION

The alkaline soluble resin (A) in the photosensitive resin composition of the present invention is used as a binder and comprises a copolymer obtained from the copolymerization of (I) a monomer of the formula (1) below; and (II) an ethylenically unsaturated monomer containing at least one carboxy group; and optionally (III) other copolymerizable ethylenically unsaturated monomer

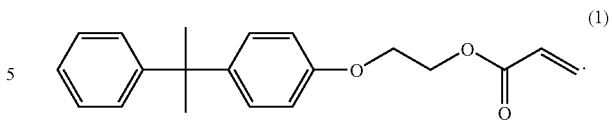

The monomer of formula (1) is cumyl phenoxyl ethyl acrylate, which can be copolymerized with a carboxy-group containing ethylenically unsaturated monomer. Due to the presence of a carboxy group, the resultant copolymer can dissolve in an alkaline developer.

Examples of the above-mentioned ethylenically unsaturated monomer containing at least one carboxy group include unsaturated mono-acids, such as acrylic acid, methacrylic acid, butenoic acid, α-chloroacrylic acid, ethyl acrylic acid, crotonic acid, and cinnamic acid; unsaturated di-acids (anhydrides), such as maleic acid, maleic anhydride, fumaric acid, fumaric anhydride, citroconic acid, citroconic anhydride, itaconic acid, itaconic anhydride, and mesaconic acid; unsaturated tri- or poly-acids (anhydrides); mono-((meth)acryloyloxyalkyl) carboxylic acid esters, such as mono-(2-methacryloyloxyethyl) succinic acid ester; and the mono-((meth)acrylic acid esters) of the polymers that are terminated at both ends with carboxy groups, such as ω-carboxy poly-caprolactone mono-acrylic acid ester and ω-carboxy polycaprolactone mono-methacrylic acid ester. Said ethylenically unsaturated monomers containing at least one carboxy group may be used alone or in admixture.

The above-mentioned alkaline soluble resin may optionally contain other copolymerizable ethylenically unsaturated monomer(s). Examples of such monomers include aromatic vinyl compounds, such as styrene, α-methylstyrene, vinyl toluene, chlorostyrene, and methoxystyrene; unsaturated carboxylic acid esters, such as methyl acrylate, methyl methacrylate, ethyl acrylate, ethyl methacrylate, propyl acrylate, propyl methacrylate, butyl acrylate, butyl methacrylate, 2-hydroxyethyl acrylate, 2-hydroxyethyl methacrylate, benzyl acrylate, glycidyl methacrylate, benzyl methacrylate, dodecyl methacrylate, tetradecyl methacrylate, hexadecyl methacrylate, octadecyl methacrylate, eicosyl methacrylate, and doeicosyl methacrylate; unsaturated carboxylic acid aminoalkyl esters, such as aminoethyl acrylate, aminoethyl methacrylate, aminopropyl acrylate, and aminopropyl methacrylate; unsaturated carboxylic acid glycidyl esters, such as glycidyl acrylate and glycidyl methacrylate; carboxylic acid vinyl esters, such as vinyl acetate, vinyl propionate, vinyl butyrate, and vinyl benzoate; unsaturated ethers, such as vinyl methyl ether, vinyl ethyl ether, and allyl glycidyl ether; vinyl cyanides, such as acrylonitrile, methacrylonitrile, α-chloro acrylonitrile and vinylidene cyanide; unsaturated amides or imides, such as acrylamide, methacrylamide, α-chloroacrylamide, N-hydroxyethyl acrylamide, N-hydroxyethyl methacrylamide, maleamide, N-phenyl maleimide, N-ortho-methylphenyl maleimide, N-meta-methylphenyl maleimide, N-para-methylphenyl maleimide, N-ortho-methoxyphenyl maleimide, N-meta-methoxyphenyl maleimide, N-para-methoxyphenyl maleimide, and N-cyclohexyl maleimide; aliphatic conjugate dienes, such as 1,3-butadiene and isoprene; and polymeric macromonomers, such as polystyrene, poly(methyl acrylate), poly(methyl methacrylate), poly(butyl acrylate), poly(butyl methacrylate), and silicones having terminal mono-acryloyl or mono-methacryloyl in the molecular chain; and the like. Such copolymerizable ethylenically unsaturated monomers may be used alone or in admixture.

During the polymerization reaction for obtaining the alkaline soluble resin (A) according to the present invention, a solvent should be added and then evaporated after the polymerization reaction is completed. Useful solvents for the manufacture of the alkaline soluble resin (A) include ethylene glycol monopropyl ether, diethylene glycol dimethyl ether, tetrahydrofuran, ethylene glycol methyl ether, ethylene glycol ethyl ether, diethylene glycol methyl ether, diethylene glycol ethyl ether, and diethylene glycol butyl ether, and methyl cellosolve acetate, ethyl cellosolve acetate, propylene glycol methyl ether acetate, propylene glycol ethyl ether acetate, propylene glycol propyl ether acetate, methyl ethyl ketone, and acetone. The above solvents can be used alone or in admixture.

The alkaline soluble resin (A) according to the present invention has an average molecular weight ranging from 4,000 to 50,000, preferably from 6,000 to 25,000. The amount of the monomer of formula (1) used is in the range from 5 to 95 wt %, preferably from 30 to 65 wt %, the amount of the ethylenically unsaturated monomer containing at least one carboxy group used is in the range from 5 to 95 wt %, preferably from 10 to 35 wt %, and the amount of the other copolymerizable ethylenically unsaturated monomer(s) used is in the range from 5 to 90 wt %, based on the total weight of the alkaline soluble resin.

The alkaline soluble resin according to the present invention possesses the advantages associated with a good storage stability, adhesion, developability, heat resistance, and solvent resistance.

The multi-functional monomer (B) of the photosensitive resin composition of the present invention is used in an amount ranging from 10 to 600 parts by weight, preferably from 20 to 400 parts by weight, based on 100 parts by weight of the alkaline soluble resin.

The above-mentioned multi-functional monomers are those having at least two polymerizable unsaturated bonds, among which the monomers with at least two ethylenically unsaturated groups, such as the acrylate or methacrylate compounds, are preferred.

The above-mentioned monomers with at least two ethylenically unsaturated groups are obvious to persons skilled in the art without any particular limitation. Examples of such monomers include ethylene glycol di(meth)acrylate, dicyclopentenyl di(meth)acrylate, triethylene glycol diacrylate, tetraethylene glycol di(meth)acrylate, tris(2-hydroxy ethyl)isocyanurate tri(meth)acrylate, tri(acryloxyethyl isocyanurate), trimethylolpropane tri(meth)acrylate, triethylene glycol di(meth)acrylate, neopentylglycol di(meth)acrylate, 1,4-butanediol di(meth)acrylate, 1,6-hexanediol di(meth)acrylate, pentaerythritol tri(meth)acrylate, pentaerythritol tetra(meth)acrylate, dipentaerythritol hexa(meth)acrylate, dipentaerythritol penta(meth)acrylate, dipentaerythritol tetra(meth)acrylate, and glycerol tripropanoate.

Preferably, the above-mentioned multi-functional monomers are trimethylolpropane triacrylate, pentaerythritol triacrylate, pentaerythritol tetraacrylate, dipentaerythritol tetraacrylate, dipentaerythritol pentaacrylate, dipentaerythritol hexaacrylate, and glycerol tripropanoate.

The photoinitiator (C) of the photosensitive resin composition of the present invention is used in an amount ranging from 1 to 300 parts by weight, preferably from 1 to 50 parts by weight, based on 100 parts by weight of the multi-functional monomer used.

The photoinitiator used in the present invention can provide free radicals upon exposure to light and initiate polymerization through transferring free radicals. The species of the photoinitiator suitable for the present invention are not particularly limited, which include, for example, but are not limited to, biimidazoles, benzoins, benzoin alkyl ethers, benzils, ketals, acetophenones, benzophenones (such as 2-phenylmethyl-2-dimethylamino-1-(4-morpholino-phenyl)-butan-1-one; trade name: I369 (manufactured by Ciba), 4,4'-dimethyl-amino-benzophenone, thioxanthones, morpholinopropanone (such as 2-methyl-1-[4-(methylthio)phenyl]-2-(4-morpholino)-1-propanone; trade name: I907 (manufactured by Ciba)) or a mixture thereof. Preferably, the photoinitiator is benzophenone.

The pigment (D) of the photosensitive resin composition of the present invention is used in an amount ranging from 0.1 to 300 parts by weight, preferably from 30 to 200 parts by weight, based on 100 parts by weight of the alkaline soluble resin.

The pigment used in the present invention can be any conventionally known inorganic pigment or organic pigment. Suitable inorganic pigment can be a metallic compound, such as an organometallic oxide or a metallic complex.

Examples of the organic pigment useful for the present invention include (according to the color index (C.I.) of the pigment):

C.I. Pigment Yellow 83, 110, 138, 139, 150, 155;
C.I. Pigment Orange 24, 71;
C.I. Pigment Violet 23;
C.I. Pigment Red 48:2, 48:3, 48:4, 104, 122, 177, 190, 202, 206, 207, 209, 216, 224, 254;
C.I. Pigment Blue 15:3, 15:4, 15:6, 22, 60;
C.I. Pigment Green 7, 36;
C.I. Pigment Brown 23, 25; and
C.I. Pigment Black 1, 7.

The above-mentioned pigments can be used alone and in admixture. Optionally, the pigments can be used in combination with a dispersant. Suitable dispersants can be cationic surfactants, anionic surfactants, nonionic surfactants, amphoteric surfactants, silicone surfactants, or fluoro surfactants. Examples of the surfactants include polyoxyethylene alkyl ethers, such as polyoxyethylene dodecyl ether, polyoxyethylene stearoyl ether and polyoxyethylene oleoyl ether; polyoxyethylene alkyl phenyl ethers, such as polyoxyethylene octyl phenyl ether and polyoxyethylene nonyl phenyl ether; polyethylene glycol diesters, such as polyethylene glycol dilaurylate and polyethylene glycol distearate; sorbitan fatty acid esters; fatty acid-modified polyesters; and tertiary amine-modified polyurethanes. Examples of certain species include KP (manufactured by Shin-Etsu), Fluorad (manufactured by Sumitomo 3M), Surflon (manufactured by Asaki Glass), MEGAFAC (manufactured by Dainippon Ink & Chemicals), F-Top (manufactured by Tokem Products), Polyflow (manufactured by Kyoeisha Chemical), and the like. Such surfactants can be used alone or in admixture, and in an amount ranging from 0 to 6 parts by weight, preferably from 0 to 3 parts by weight, based on 100 parts by weight of the alkaline soluble resin.

According to the present invention, the photosensitive resin composition normally comprises an organic solvent to adjust the flowability and viscosity of the composition. If the solvent is improperly selected, it may adversely affect the storage stability and coating property of the photosensitive resin composition.

The solvent (E) of the photosensitive resin composition of the present invention is used in an amount ranging from 50 to 300 parts by weight, preferably from 100 to 200 parts by weight, based on 100 parts by weight of the alkaline soluble resin. Suitable solvents for the present invention can dissolve other organic ingredients and have a high volatility such that they can be evaporated from the resultant dispersion at normal pressure with only a little amount of heat. Therefore, suitable solvents are those having a boiling point below 200° C. at normal pressure, which include, for example, aromatics, such as benzene, toluene, and xylene; alcohols, such as methanol and ethanol; ethers, such as ethylene glycol monopropyl ether, diethylene glycol dimethyl ether, tetrahydrofuran, ethylene glycol-methyl ether, ethylene glycol ethyl ether, diethylene glycol methyl ether, diethylene glycol ethyl ether, and diethylene glycol butyl ether; esters, such as methyl cellosolve acetate, ethyl cellosolve acetate, propylene glycol methyl ether acetate, propylene glycol ethyl ether acetate, propylene glycol propyl ether acetate; and ketones, such as methyl ethyl ketone and acetone. The above solvents can be used alone or in admixture.

The photosensitive resin composition of the invention may optionally comprise an additive known to persons skilled in the art, which includes, for example, but is not limited to, a filler, an antioxidant, a photo stabilizer, a defoaming agent, an adhesion promoter, a bridging agent, and a thermal stabilizer.

The photosensitive resin composition has a solids content in the range from 10 to 30 wt %, preferably from 15 to 25%. If the solids content is less than 10 wt %, cloudy coatings will be easy to occur upon application of the composition; whereas if the solids content is higher than 30 wt %, linear traces may occur upon application of the composition.

The photosensitive resin composition of the present invention can be used as a photosensitive material, a photoresist, an ink, or a coating in the manufacture of color filters for liquid crystal displays. The photosensitive resin composition exhibits excellent development and adhesion properties.

Suitable lithographic methods that use the photosensitive resin composition of the present invention are obvious to persons skilled in the art. For example, a suitable method comprises the following steps:

(I) homogeneously mixing components (A) to (E) and optionally conventional additive(s) in a mixer to form a colloidal composition;

(II) coating the colloidal composition onto the surface of a substrate to form a coating layer;

(III) placing the coated substrate into an oven for soft baking at 70 to 90° C. for 1 to 15 minutes so as to evaporate the solvent;

(IV) covering the substrate with a mask, irradiating the coating layer with an energetic radiation (at an irradiation intensity of 1 to 300 mJ/cm$^2$, preferably 10 to 100 mJ/cm$^2$) to result in photo-polymerization, developing the irradiated portions in a suitable developing manner, such as soak development, spray development, or agitation development, at 23±2° C. for 30 seconds to 5 minutes, and rinsing with a developing solution to remove the unexposed soluble resin so as to obtain the desired pattern; and (V) hard baking the substrate by a heating device, such as a hot plate or an oven, at 150 to 250° C. for 5 to 90 minutes.

If necessary, the above steps can be repeated.

The developing solution used in the above-mentioned step (IV) is not particularly limited, and can be, for example, an aqueous solution of an alkali compound such as sodium hydroxide, potassium hydroxide, sodium carbonate, sodium bicarbonate, calcium carbonate, ammonia, diethylamine, tetramethyl ammonium hydroxide (TMAH).

The following examples are used to further illustrate the present invention, and are not intended to limit the scope of the present invention. Any modifications and changes that can be achieved by persons skilled in the art are within the scope of the disclosure of the specification.

WORKING EXAMPLE AND COMPARATIVE EXAMPLE

Photosensitive resin compositions were prepared by dissolving and mixing an alkaline soluble resin (A), a multifunctional monomer (B), a photoinitiator (C), a pigment (D), and a solvent (E) with the compositions as shown in Table 1:

TABLE 1

| Component | | Working Example | Comparative Example |
|---|---|---|---|
| Alkaline soluble resin (A) | A1 | 1.44 | — |
| (parts by weight) | A2 | 0.96 | 1.08 |
| | A3 | 1.92 | 3.96 |
| | A4 | 0.96 | — |
| | A5 | 0.27 | — |
| | A6 | 0.45 | 0.96 |
| | A7 | 9.0 | 9.0 |
| Multi-functional monomer (B) (parts by weight) | B1 | 7.5 | 7.5 |
| Photoinitiator (C) | C1 | 1.5 | 1.5 |
| (parts by weight) | C2 | 1 | 4 |
| Pigment(D) (parts by weight) | D1 | 15 | 15 |
| Solvent(E) (parts by weight) | E1 | 12 | 12 |

A1: 2-(para-isopropylphenyl-phenoxy)-ethyl acrylate (DMAC-1, Eternal Chemical)
A2: methacrylic acid (MAA, Eternal Chemical)
A3: Benzyl methacrylate (BzMA, San Esters Corp.)
A4: methyl methacrylate (MMA, Bimax)
A5: butyl methacrylate (BMA, Advanced Technology & Industrial)
A6: glycidyl methacrylate (GMA, Dow Chemical)
A7: propylene glycol methyl ether acetate (PGMEA, Dow Chemcial)
B1: dipentaerythritol hexaacrylate (DPHA, Eternal Chemical)
C1: I369 (Ciba); 2-benzyl-2-dimethylamino-1-(4-morpholinophenyl)-butan-1-one
C2: I907 (Ciba); 2-methyl-1-[4-(methylthio)phenyl]-2-(4-morpholinyl
D1: C.I. Pigment Blue 15:6 (DIC)
E1: propylene glycol methyl ether acetate (PGMEA, Dow Chemical)

Test Methods:

Viscosity test: Determining the viscosity (in the unit of cps) of the resultant photosensitive resin compositions at a constant temperature of 25° C. and a spin speed of 100 rmp with an E-TYPE viscometer (Toki Sangyo).

Developing rate test: Performing development for 30 seconds, washing with water for 30 seconds, and observing the just time.

The results are shown in Table 2 below.

Table 2
| Item | | Comparative Example | Working Example |
|---|---|---|---|
| Viscosity (%) | | 4.52 | 4.43 |
| Spin speed (rpm) | | 500 | |
| Irradiation Energy (mJ/cm$^2$) | | 100 | |
| Gap between mask and film (um) | | 150 | |
| Dev Efficiency Just time/Dev time(sec) | | 13/ 30 | 5/ 30 |
| Thickness of film (um) | | 1.0935 | 1.0603 |
| Y | | 23.474 | 23.079 |
| x | | 0.1434 | 0.1429 |
| y | | 0.1646 | 0.1634 |
| Result | Roughness (Å) | 47.2 | 21.9 |
| | Line width (um) (mask 68 um) | 68 | 68 |
| | SEM Micrography | 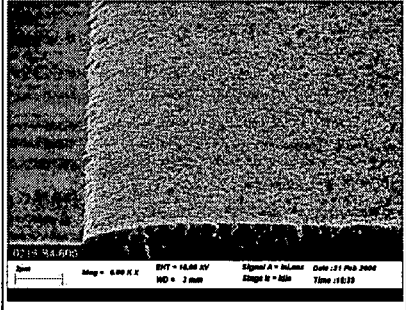 | 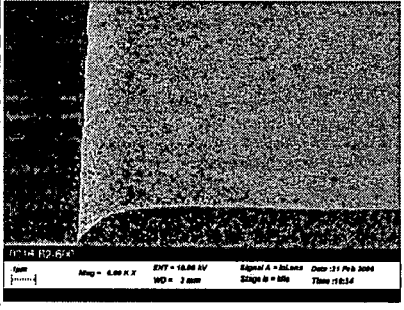 |

It can be seen from the results in Table 2 that since the photosensitive resin composition of the working example includes a copolymer with a special structure, it can be developed more rapidly and has a more smooth pattern after being developed, and thus can solve the problem associated with the slow development encountered by using color resists and enhance the fineness of the pattern, whereby avoiding the necessity of a CMP process and reducing the costs.

What is claimed is:

1. A photosensitive resin composition, comprising:
(A) an alkaline soluble resin;
(B) a multi-functional monomer;
(C) a photoinitiator;
(D) a pigment; and
(E) a solvent,
wherein the amount of the multi-functional monomer (B) is in a range from 10 to 600 parts by weight, the amount of the pigment (D) is in a range from 0.1 to 300 parts by weight, and the amount of the solvent (E) is in a range from 50 to 300 parts by weight, based on 100 parts by weight of the alkaline soluble resin, and the amount of the photoinitiator (C) is in a range from 1 to 300 parts by weight based on 100 parts by weight of the multi-functional monomer (B), and wherein said alkaline soluble resin is a copolymer obtained from the copolymerization of a monomer of the formula (1) below and an ethylenically unsaturated monomer containing at least one carboxy group:

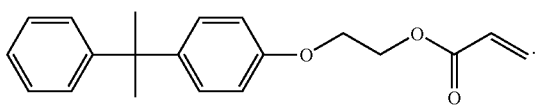

(1)

2. The photosensitive resin composition according to claim 1, having a solids content in the range from 10 to 30 wt %.

3. The photosensitive resin composition according to claim 1, wherein the ethylenically unsaturated monomer containing at least one carboxy group is selected from the group consisting of acrylic acid, methacrylic acid, butenoic acid, $\alpha$-chloroacrylic acid, ethyl acrylic acid, crotonic acid, cinnamic acid, maleic acid, maleic anhydride, fumaric acid, fumaric anhydride, citroconic acid, citroconic anhydride, itaconic acid, itaconic anhydride, mesaconic acid, mono-(2-methacryloyloxyethyl) succinic acid ester, $\omega$-carboxy polycaprolactone mono-acrylic acid ester, $\omega$-carboxy polycaprolactone mono-methacrylic acid ester, and a mixture thereof.

4. The photosensitive resin composition according to claim 1, wherein the alkaline soluble resin (A) further comprises other copolymerizable ethylenically unsaturated monomer.

5. The photosensitive resin composition according to claim 1, wherein the multi-functional monomer (B) is selected from the group consisting of trimethylolpropane triacrylate, pentaerythritol triacrylate, pentaerythritol tetraacrylate, dipentaerythritol tetraacrylate, dipentaerythritol pentaacrylate, dipentaerythritol hexaacrylate, and glycerol tripropanoate.

6. The photosensitive resin composition according to claim 1, wherein the photoinitiator (C) is selected from the group consisting of biimidazoles, benzoins, benzoin alkyl ethers, benzils, ketals, acetophenones, benzophenones, 4,4'-dimethyl-amino-benzophenone, thioxanthones, morpholinopropanone and a mixture thereof.

* * * * *

UNITED STATES PATENT AND TRADEMARK OFFICE
CERTIFICATE OF CORRECTION

PATENT NO.         : 7,601,764 B2                                                Page 1 of 1
APPLICATION NO. : 11/891188
DATED              : October 13, 2009
INVENTOR(S)        : Tu-Yi Wu et al.

It is certified that error appears in the above-identified patent and that said Letters Patent is hereby corrected as shown below:

Title page, (73), Assignee: "Axin" should read --Daxin--

Signed and Sealed this

Seventh Day of December, 2010

David J. Kappos
*Director of the United States Patent and Trademark Office*